(12) United States Patent
Kyusojin

(10) Patent No.: US 7,639,743 B2
(45) Date of Patent: Dec. 29, 2009

(54) IMAGE DECODER AND IMAGE DECODING METHOD AND PROGRAM

(75) Inventor: Hiroshi Kyusojin, Houston, TX (US)

(73) Assignee: Sony Corporation, Tokyo (JP)

( * ) Notice: Subject to any disclaimer, the term of this patent is extended or adjusted under 35 U.S.C. 154(b) by 827 days.

(21) Appl. No.: 10/809,227

(22) Filed: Mar. 25, 2004

(65) Prior Publication Data

US 2005/0213665 A1  Sep. 29, 2005

(51) Int. Cl.
*H04N 7/12* (2006.01)
*H04N 11/02* (2006.01)
(52) U.S. Cl. .................................. 375/240.25
(58) Field of Classification Search ............ 375/240.25, 375/240
See application file for complete search history.

(56) References Cited

U.S. PATENT DOCUMENTS

| | | | | |
|---|---|---|---|---|
| 5,745,520 A | * | 4/1998 | Love et al. | 375/130 |
| 5,907,330 A | * | 5/1999 | Simmers | 345/542 |
| 5,949,484 A | * | 9/1999 | Nakaya et al. | 348/384.1 |
| 6,198,773 B1 | * | 3/2001 | Gill et al. | 375/240.26 |
| 6,259,734 B1 | * | 7/2001 | Boon | 375/240 |
| 6,944,229 B2 | * | 9/2005 | Son et al. | 375/240.25 |
| 7,142,204 B2 | * | 11/2006 | Shiotsu et al. | 345/211 |
| 7,246,249 B2 | * | 7/2007 | Shiiyama | 713/320 |

OTHER PUBLICATIONS

Larhiri et al., Communication Architecture Based POower Management for Battery Efficient system Design, DAC 2002.*
"Toward the Placement of Power Management Points in Real Time Applications", Compliers and operating systems for low power, p. 37-52, 2003.*
Watts et al., "Dynamic Management in Embedded Systems", IEE Electronics Systems and Software, p. 18-22, Oct./Nov. 2003.*

* cited by examiner

*Primary Examiner*—Tung Vo
*Assistant Examiner*—Anner Holder
(74) *Attorney, Agent, or Firm*—Frommer Lawrence & Haug LLP; William S. Frommer; Thomas F. Presson

(57) ABSTRACT

In an image decoder, anticipated battery energy to be consumed is obtained from consumed battery energy when motion picture data is played for a predetermined time. In case the anticipated battery energy to be consumed is more than a current remaining battery energy, a playing quality is deteriorated to play the motion picture data to the last. Further, the playing quality of the motion picture data is dynamically controlled on the basis of the number of frames that can be displayed during a unit time. Thus, in case there is enough power for processing in a CPU, the playing quality of the motion picture data is improved. In case there is not enough power for processing in the CPU, the playing quality of the motion picture data is deteriorated to complete a decoding process within the unit time. Thus, the playing quality of the motion picture data is dynamically controlled in accordance with the CPU frequency or the remaining battery time.

8 Claims, 11 Drawing Sheets

IMAGE DECODER AND IMAGE DECODING METHOD AND PROGRAM

BACKGROUND OF THE INVENTION

1. Field of the Invention

The present invention relates to an image decoder, an image decoding method and a program for dynamically controlling a playing quality in accordance with the frequency of a Central Processing Unit (CPU) or the remaining battery time when motion picture data is decoded and played.

2. Description of the Related Art

In recent years, when image contents are played in a portable terminal run by a battery such as a note book type personal computer or a PDA (Personal Digital Assistant), the CPU operates under a fixed frequency irrespective of the contents of the motion picture data. Accordingly, when the CPU frequency is low, the decoding operation of a part of frames is not completed within a predetermine time. Thus, a frame is undesirably dropped so that the motion picture data cannot be sometimes played with a sufficient quality. On the other hand, when the CPU frequency is high, the CPU frequency is higher than necessary. Accordingly, since the electric power of the battery is undesirably consumed more than necessary, the image contents may not be possibly played to the last due to the insufficiency of the remaining battery time.

In recent years, as CPUs mounted on the portable terminal, there are not a few CPUs that can dynamically switch the CPU frequency. For example, a CPU featuring Enhanced SpeedStep (a trademark) of Intel Corporation has two-stage modes including a maximum performance mode and a battery optimized mode that can be automatically switched depending on a computational load. However, when the CPU frequency is adjusted depending on the computational load as described above, a computational load monitor mechanism for monitoring the computational load of the CPU is required. Therefore, the computational load monitor mechanism consumes an electric power to insufficiently save the electric power.

Thus, in Japanese Patent Application Laid Open No. 2003-280760, a technique is proposed that a computational load monitor mechanism for monitoring the computational load of a CPU is not provided and the CPU frequency is adjusted on the basis of the length of each frame data of motion picture data encoded with an MPEG (Moving Picture Experts Group) standard. According to the technique disclosed in this Patent Document, when the length of the frame data is short, the CPU frequency is adjusted to be low so that a consumed power can be suppressed. When the length of the frame data is long, the CPU frequency is adjusted to be high so that the data can be completely decoded within a predetermined time.

In the above-described technique, the CPU frequency can be dynamically controlled depending on the contents of the motion picture data. However, the playing quality of the motion picture data cannot be dynamically controlled in accordance with the CPU frequency or the remaining battery time. Accordingly, the technique disclosed in the Patent Document cannot supports a request of a user who wants to enjoy image contents with a high quality, for instance, when there is enough power for processing in the CPU.

SUMMARY OF THE INVENTION

The present invention is proposed to cope with the above-described circumstances and it is an object of the present invention to provide an image decoder, an image decoding method and a program that can dynamically controlling the playing quality of motion picture data in accordance with the CPU frequency or the remaining battery time when the motion picture data is decoded and played.

In order to achieve the above-described object, according to the present invention, an image decoder for decoding encoded motion picture data composed of image data having a plurality of frames and displaying decoded motion picture data comprises: an electric power supplying means for supplying an electric power to respective units of the image decoder; a decoding means for sequentially decoding each image data of the encoded motion picture data; a displaying means for sequentially displaying each image data of the decoded motion picture data; and a controlling means for controlling a decoding process in the decoding means on the basis of anticipated energy to be required for playing the motion picture data and remaining energy of the electric power supplying means to dynamically control the playing quality of the motion picture data.

Further, in order to achieve the above-described object, according to the present invention, an image decoding method of an image decoder for decoding encoded motion picture data composed of image data having a plurality of frames and displaying decoded motion picture data comprises: a decoding step for sequentially decoding each image data of the encoded motion picture data; a displaying step for sequentially displaying each image data of the decoded motion picture data on a displaying means; and a controlling step for controlling a decoding process in the decoding step on the basis of anticipated energy to be required for playing the motion picture data and remaining energy of an electric power supplying means for supplying electric power to respective units of the image decoder to dynamically control the playing quality of the motion picture data.

In the above-described image decoder and the image decoding method, when the encoded motion picture data composed of image data having a plurality of frames is decoded and the decoded motion picture data is displayed, the decoding process is controlled on the basis of anticipated energy to be required for playing the motion picture data and remaining energy of an electric power supplying means. Thus, the playing quality of the motion picture data is dynamically controlled.

Further, in order to achieve the above-described object, according to the present invention, an image decoder for decoding encoded motion picture data composed of image data having a plurality of frames and displaying decoded motion picture data comprises: a decoding means for sequentially decoding each image data of the encoded motion picture data; a displaying means for sequentially displaying each image data of the decoded motion picture data; and a controlling means for controlling a decoding process in the decoding means to dynamically control the playing quality of the motion picture data. In case the current CPU frequency of the decoding means is higher than a first CPU frequency necessary for displaying a predetermined number of frames during a unit time, the controlling means dynamically controls the playing quality of the motion picture data correspondingly to the remainder of the CPU frequency.

Further, in order to achieve the abode-described object, according to the present invention, an image decoding method of an image decoder for decoding encoded motion picture data composed of image data having a plurality of frames and displaying decoded motion picture data comprises: a decoding step for sequentially decoding each image data of the encoded motion picture data; a displaying step for sequentially displaying each image data of the decoded motion picture data on a displaying means; and a controlling step for controlling a decoding process in the decoding step to dynamically control the playing quality of the motion picture data. In case the current CPU frequency of the decoding step is higher than a first CPU frequency necessary for displaying a predetermined number of frames during a unit time, the controlling step dynamically controls the playing quality of the motion picture data correspondingly to the remainder of the CPU frequency.

In the above-described image decoder and the image decoding method, when the encoded motion picture data composed of image data having a plurality of frames is decoded and the decoded motion picture data is displayed, in case the current CPU frequency of the decoding means or step is higher than a first CPU frequency necessary for displaying a predetermined number of frames during a unit time, the controlling means or step dynamically controls the playing quality of the motion picture data correspondingly to the remainder of the CPU frequency.

Further, in order to achieve the above-described object, according to the present invention, an image decoder for decoding encoded motion picture data composed of image data having a plurality of frames and displaying decoded motion picture data comprises: a decoding means for sequentially decoding each image data of the encoded motion picture data; a displaying means for sequentially displaying each image data of the decoded motion picture data; and a controlling means for controlling a decoding process in the decoding means to dynamically control the playing quality of the motion picture data. The controlling means dynamically controls the playing quality of the motion picture data on the basis of a unit time during which a predetermined number of frames is to be displayed, a time required for displaying the predetermined number of frames, or an anticipated time to be required for displaying the predetermined number of frames.

Further, in order to achieve the above-described object, according to the present invention, an image decoding method of an image decoder for decoding encoded motion picture data composed of image data having a plurality of frames and displaying decoded motion picture data comprises: a decoding step for sequentially decoding each image data of the encoded motion picture data; a displaying step for sequentially displaying each image data of the decoded motion picture data on a displaying means; and a controlling step for controlling a decoding process in the decoding step to dynamically control the playing quality of the motion picture data. The controlling step dynamically controls the playing quality of the motion picture data on the basis of a unit time during which a predetermined number of frames is to be displayed, a time required for displaying the predetermined number of frames, or an anticipated time to be required for displaying the predetermined number of frames.

In the above-described image decoder and the image decoding method, when the encoded motion picture data composed of image data having a plurality of frames is decoded and the decoded motion picture data is displayed, the controlling means or step dynamically controls the playing quality of the motion picture data on the basis of a unit time during which a predetermined number of frames is to be displayed, a time required for displaying the predetermined number of frames, or an anticipated time to be required for displaying the predetermined number of frames.

Furthermore, a program according to the present invention serves to execute the above-described image decoding process in the image decoder.

In the above-described image decoder, the image decoding method and the program, when the encoded motion picture data composed of image data having a plurality of frames is decoded and the decoded motion picture data is displayed, the decoding process is controlled on the basis of anticipated energy to be required for playing the motion picture data and remaining energy of an electric power supplying means. Thus, the playing quality of the motion picture data is dynamically controlled. For instance, in case remaining energy supplied by the electric power supplying means is smaller than anticipated energy to be required for playing the motion picture data, the playing quality of the motion picture data is lowered so that the image contents can be displayed to the last.

Further, in the above-described image decoder, the image decoding method and the program, when the encoded motion picture data composed of image data having a plurality of frames is decoded and the decoded motion picture data is displayed, in case the current CPU frequency of the decoding means or step is higher than a first CPU frequency necessary for displaying a predetermined number of frames during a unit time, the controlling means or step dynamically controls the playing quality of the motion picture data correspondingly to the remainder of the CPU frequency. Thus, the remainder is effectively used without changing the CPU frequency to improve the playing quality of the motion picture data.

In the above-described image decoder, the image decoding method and the program, when the encoded motion picture data composed of image data having a plurality of frames is decoded and the decoded motion picture data is displayed, the controlling means or step dynamically controls the playing quality of the motion picture data on the basis of a unit time during which a predetermined number of frames is to be displayed, a time required for displaying the predetermined number of frames, or an anticipated time to be required for displaying the predetermined number of frames. Accordingly, for instance, in case there is enough power for the decoding process, the playing quality of the motion picture data can be improved. In case there is not enough power for the decoding process, the playing quality of the motion picture data is lowered so that the decoding process for a predetermined number of frames can be completed within a unit time.

DETAILED DESCRIPTION OF THE PREFERRED EMBODIMENTS

Figure 1:
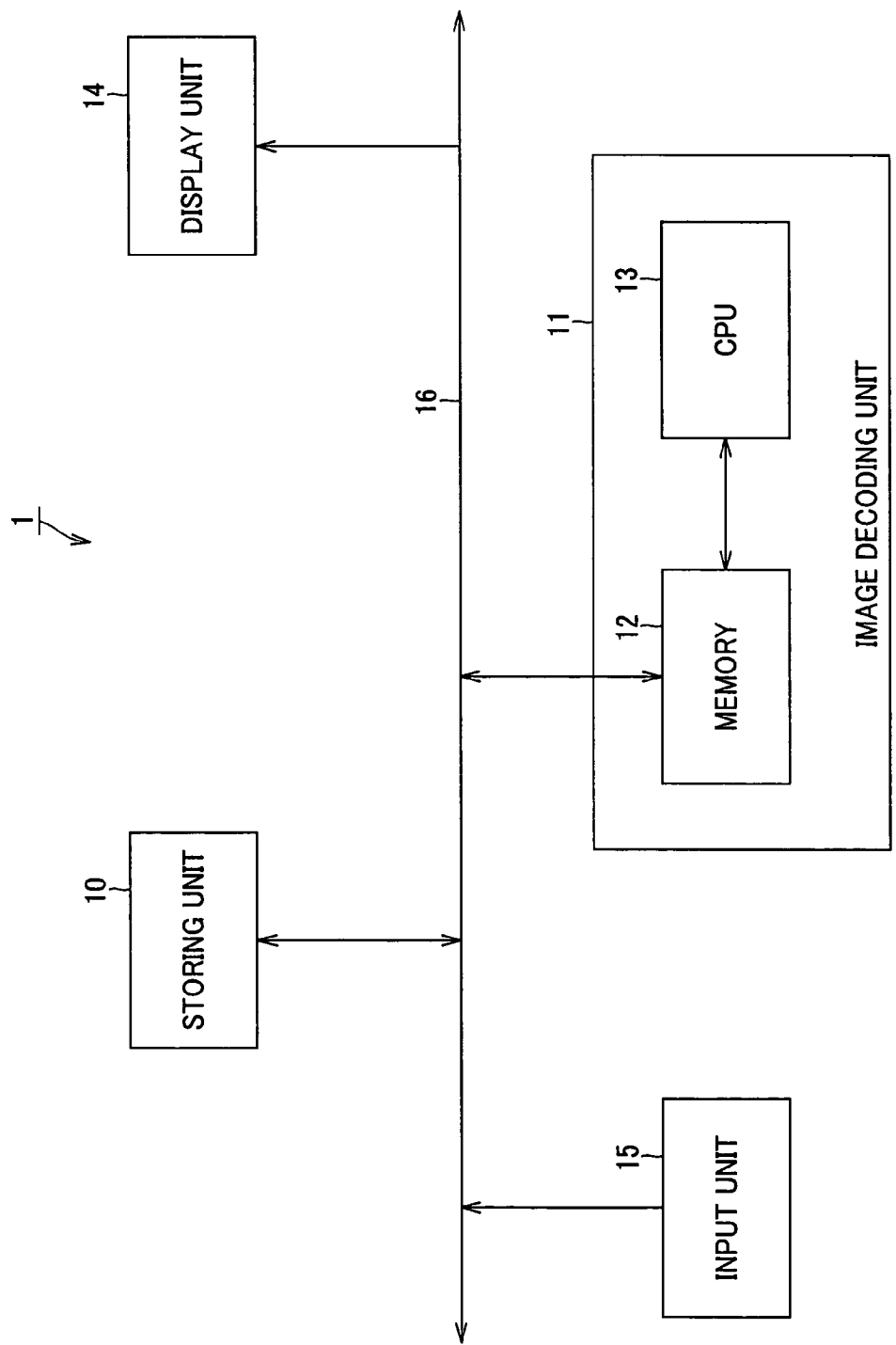
FIG. 1 is a diagram showing a schematic structure of an image decoder according to an embodiment of the present invention.

Now, specific embodiments to which the present invention is applied will be described below in detail by referring to the drawings. In the embodiments, the present invention is applied to an image decoder that decodes motion picture data compressed and encoded according to JPEG2000 (Joint Photographic Experts Group 2000) standard and displays thus decoded motion picture data.

Firstly, the schematic structure of an image decoder in first to third embodiments is shown in FIG. 1. As shown in FIG. 1, the image decoder 1 comprises a storing unit 10 for storing compressed and encoded motion picture data such as a hard disc or a CD-ROM (Compact Disc-Read Only Memory), an image decoding unit 11 for decoding the motion picture data stored in the storing unit 10, a display unit 14 for displaying the decoded motion picture data such as a CRT (Cathode Ray Tube) or an LCD (Liquid Crystal Display) and an input unit 15 for inputting information such as a requested playing quality by a user such as a keyboard or a mouse. These units are connected together over a bus 16.

The image decoding unit 11 includes a memory 12 for properly reading the motion picture data stored in the storing unit 10 to temporarily store the motion picture data and a CPU (Central Processing Unit) 13 for executing a process for decoding the motion picture data stored in the memory.

The image decoder 1 has a battery (not shown) and is run by the electric power of the battery.

In the above-described image decoder 1, when the motion picture data is played, image data necessary for decoding at least one frame of the motion picture data stored in the storing unit 10 is firstly read in the memory 12 of the image decoding unit 11 over the bus 16. The image data read in the memory 12 is decoded by using the CPU 13 so as to have a playing quality designated by a user through the input unit 15 to obtain image data that can be displayed. As a value of representing the playing quality, a frame rate (Frame Per Second; fps) that shows the number of image frames displayed in one second or an image quality (Bit Per Pixel; bpp) that shows the number of bits of data used in one pixel is exemplified. Then, the image data capable of being displayed is read out in the display unit 14 over the bus 16 from the memory 12 and displayed after timing is adjusted if necessary.

First Embodiment

As described above, the image decoder 1 is run by the battery that is not shown in the drawings. Since the energy of the battery is limited, image contents may not be possibly played to the last due to the deficiency in the remaining battery time.

Thus, in the image decoder 1, the playing quality of the image contents is controlled in such a manner as described below on the basis of the remaining battery energy during a playing processing to suppress battery energy to be consumed. A process in this case is shown in a flow chart in FIG. 2, which may be implemented by a computer-readable medium. In this flow chart, the image decoder 1 has a computational load monitor mechanism (not shown) to automatically adjust a CPU frequency in accordance with the load of the CPU 13.

Firstly, in step S1, the image contents are played during a predetermined time Δs. In step S2, consumed battery energy Δb during that time is measured. The predetermined time Δs in the step S1 may be any value having a length during which the consumed battery energy Δb can be measured.

Subsequently, in step S3, it is decided whether or not anticipated battery energy to be consumed when the rest of the image contents is played is not higher than the currently remaining battery energy. Specifically, Δb is divided by Δs to obtain battery energy to be consumed per unit time (Δb/Δs). Then, the (Δb/Δs) is multiplied by the remaining time "s" of the image contents to obtain anticipated battery energy to be consumed (Δb/Δs×s). Then, it is decided whether or not the anticipated battery energy to be consumed (Δb/Δs×s) is less than the currently remaining battery energy "b".

In the step S3, in case the anticipated battery energy to be consumed is less than the currently remaining battery energy (Yes), since the image contents can be played to the last under this state, the process is finished. On the other hand, in case the anticipated battery energy to be consumed is not less than the currently remaining battery energy (No), since the electric power of the battery will be run out during the playing processing of the image data, the frame rate is changed. Specifically, assuming that the current frame rate is "m" (fps), in step S4, it is decided whether or not m−1 is larger than 0. In case m−1 is larger than 0 (Yes), a new frame rate m' of m−1 is set up in step S5 to return to the step S1. On the other hand, in the step S4, in case m−1 is not larger than 0 (No), an error message is displayed in step S6 to finish the process.

As described above, in case the anticipated battery energy to be consumed is not lower than the currently remaining battery energy, the frame rate is lowered to reduce the throughput of the data and decrease the computational load of the CPU 13. As a result, the frequency of the CPU 13 is automatically adjusted to be low to decrease the consumed battery energy Δb at a next measurement. The above-described processes are repeated so that the anticipated battery energy to be consumed is less than the remaining battery energy at a certain time. Thus, the image contents can be played to the last.

Figure 2:
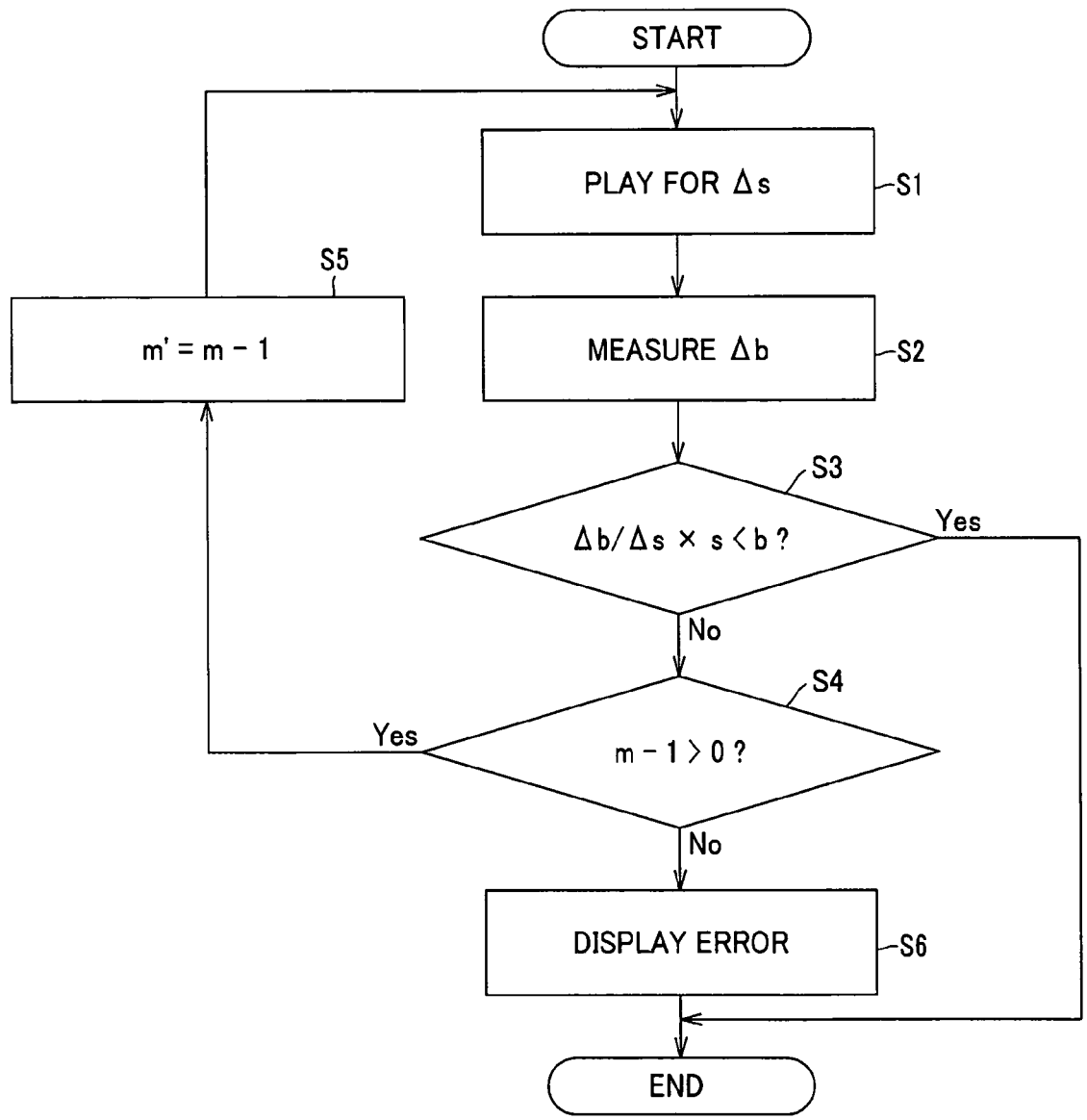
FIG. 2 is a flow chart for explaining a process when a frame rate is changed on the basis of an anticipated battery energy to be consumed and a remaining battery energy.

On the other hand, the relation between a playing time and the consumed battery energy is not necessarily linear. So, the anticipation of consumption of the battery may not be correct, so that energy not less than the anticipated battery energy to be consumed may be consumed during the playing processing of the data. Thus, the process shown in FIG. 2 is periodically carried out, for instance, every five minutes to more increase a certainty.

Figure 3:
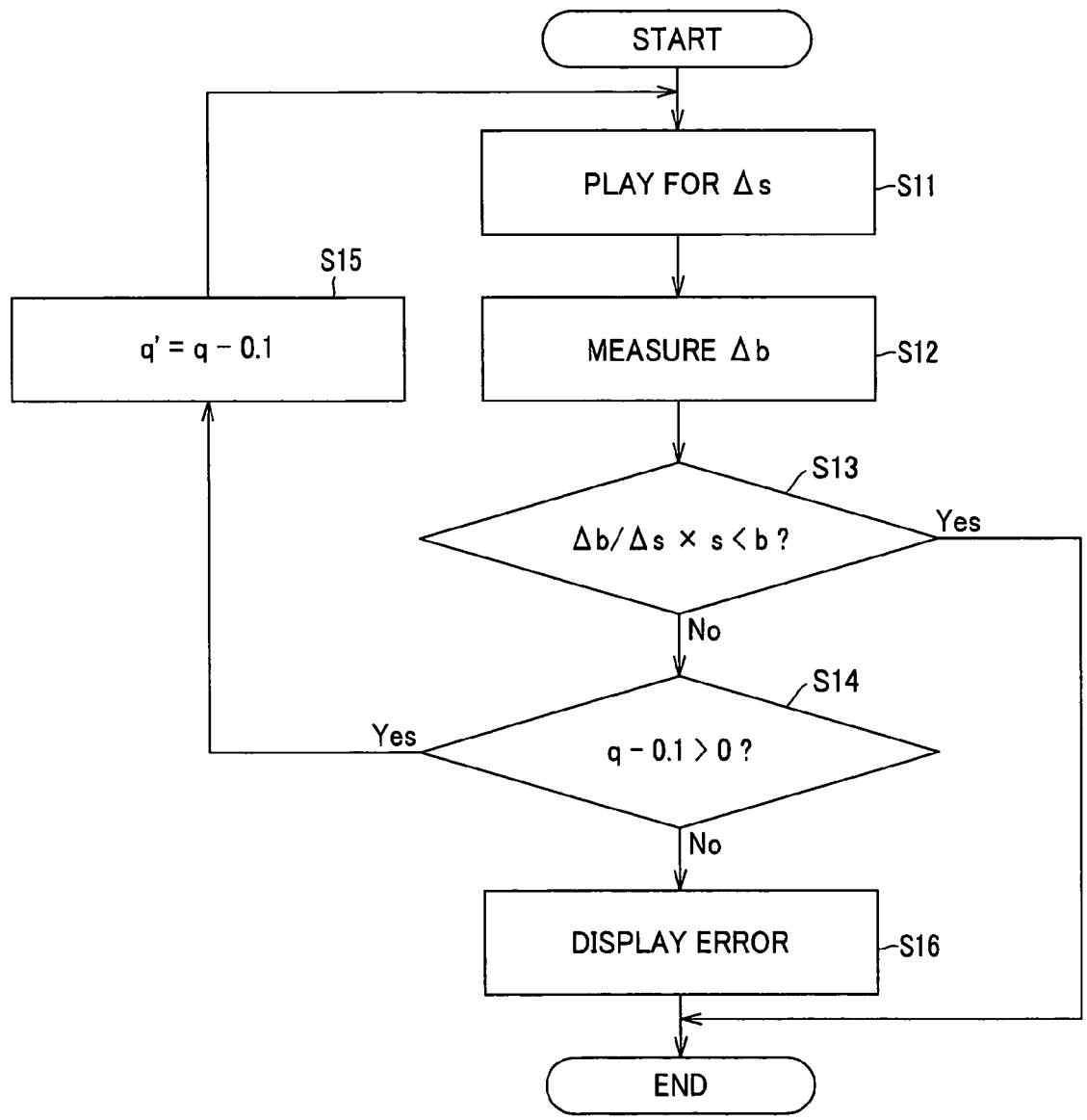
FIG. 3 is a flow chart for explaining a process when the number of bits per pixel is changed on the basis of the anticipated battery energy to be consumed and the remaining battery energy.

Further, not only the frame rate, but also the image quality of the image contents, specifically, the number of bits per pixel can be changed. That is, the encoded data in which each frame data is encoded with the JPEG 2000 standard has a layered structure divided into a plurality of layers, and the number of layers to be decoded is changed to easily change the number of bits per pixel. For instance, it is assumed that each frame data is divided into 20 layers. At this time, when all the layers are decoded, the number of bits per pixel is 1.0 (1.0 bpp). When six layers are decoded from the uppermost layer, the number of bits per pixel is 0.3 (0.3 bpp). Accordingly, the number of bits per pixel is changed in the same manner as the above-described frame rate. In case the anticipated battery energy to be consumed is not less than the currently remaining battery, the image quality is deteriorated. Accordingly, the anticipated battery energy to be consumed becomes less than the remaining battery energy at a certain time, so that the image contents can be played to the last. A process in this case is shown in a flow chart in FIG. 3.

Similarly to the above-described process, in step S11, the image contents are played during a predetermined time $\Delta s$. In step S12, the consumed battery energy $\Delta b$ during that time is measured. Subsequently, in step S13, it is decided whether or not the anticipated battery energy to be consumed ($\Delta b/\Delta s \times s$) is less than the currently remaining battery energy "b".

In the step S13, in case the anticipated battery energy to be consumed is less than the currently remaining battery energy (Yes), the process is finished. On the other hand, in case the anticipated battery energy to be consumed is not less than the currently remaining battery energy (No), since the electric power of the battery will be run out during the playing of the image data, the image quality is changed. Specifically, assuming that the current image quality is "q" (bpp), in step S14, it is decided whether or not q−0.1 is larger than 0. In case q−0.1 is larger than 0 (Yes), a new frame rate q' of q−0.1 is set up in step S15 to return to the step S1. On the other hand, in the step S14, in case q−0.1 is not larger than 0 (No), an error message is displayed in step S16 to finish the process.

As described above, in case the anticipated battery energy to be consumed is not lower than the currently remaining battery energy, the image quality is lowered to reduce the throughput of the data and decrease the computational load of the CPU 13. As a result, the frequency of the CPU 13 is automatically adjusted to be low to decrease the consumed battery energy $\Delta b$ at a next measurement. The above-described processes are repeated so that the anticipated battery energy to be consumed is less than the remaining battery energy at a certain time. Thus, the image contents can be played to the last.

Figure 4:
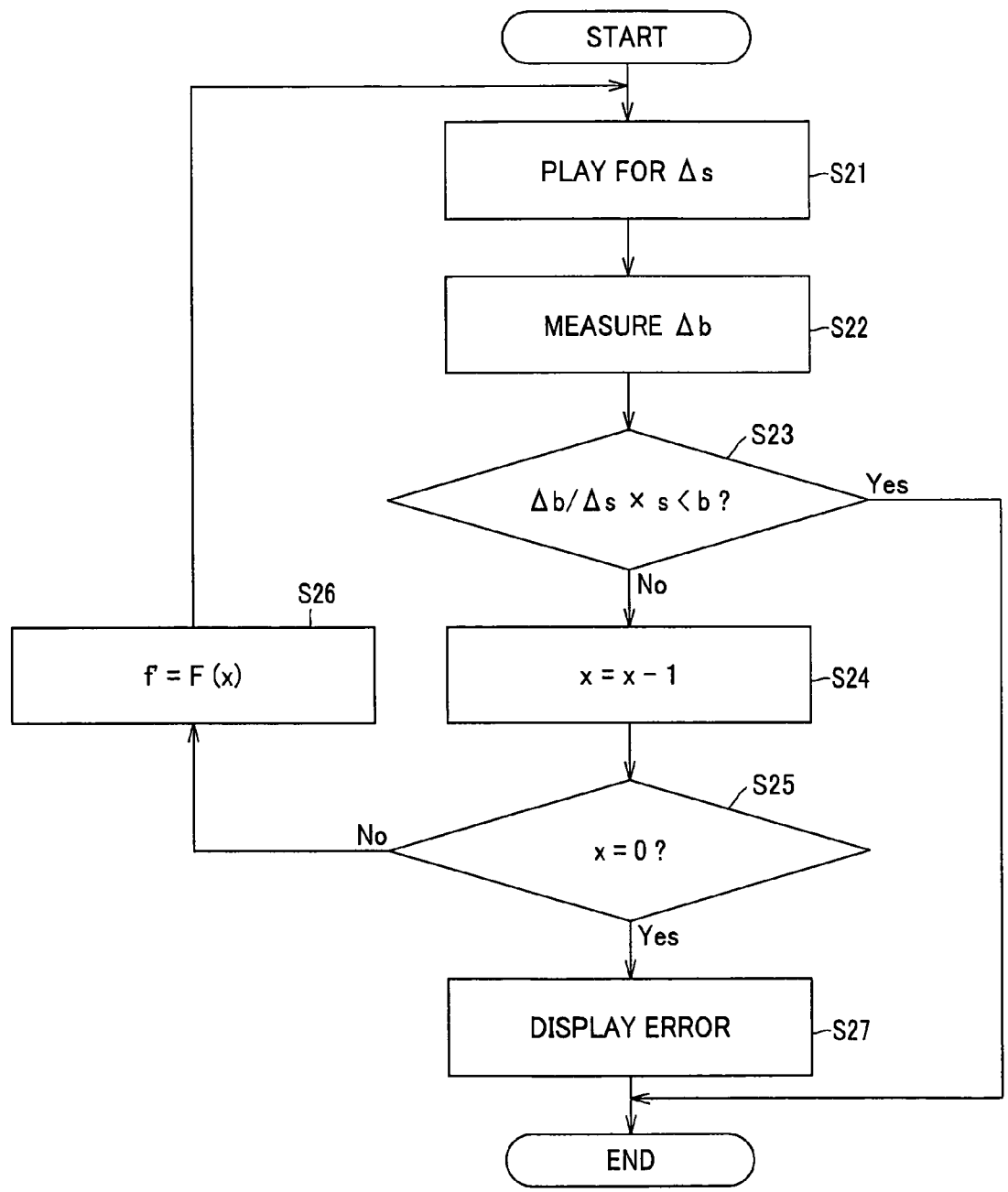
FIG. 4 is a flow chart for explaining a process when the CPU frequency is changed on the basis of the anticipated battery energy to be consumed and the remaining battery energy.

In the above-described embodiment, the image decoder 1 has the computational load monitor mechanism (not shown) in which, when the computational load of the CPU 13 is reduced, the frequency of the CPU 13 is automatically adjusted to be low. However, in case the computational load monitor mechanism is not provided, or in case a user requests to perform a finer control even if the computational load monitor mechanism is provided, the frequency of the CPU 13 can be specifically designated. A process in this case is shown in a flow chart of FIG. 4. In this example, the frequency of the CPU 13 is set to 100 MHz, which may be changed to 80 MHz, 60 MHz and 40 MHz. Further, it is assumed that F(x)={40, 60, 80, 100} and a variable "x" indicates an index of the current CPU frequency. That is, F(1)=40, F(2)=60, F(3)=80 and F(4)=100.

Firstly, in step S21, the image contents are played during a predetermined time $\Delta s$. In step S22, the consumed battery energy $\Delta b$ during that time is measured. Subsequently, in step S23, it is decided whether or not the anticipated battery energy to be consumed ($\Delta b/\Delta s \times s$) is less than the currently remaining battery energy "b".

In the step S23, in case the anticipated battery energy to be consumed is less than the currently remaining battery energy (Yes), the process is finished. On the other hand, in case the anticipated battery energy to be consumed is not less than the currently remaining battery energy (No), since the electric power of the battery will be run out during the playing of the image data, the index "x" is decreased by 1 to change the frequency of the CPU 13 in step S24.

Subsequently, in step S25, it is decided whether or not "x" is 0. In case "x" is not 0 (No), a new CPU frequency f' of F(x) is set up in step S26 to return to the step S21. On the other hand, in the step S25, in case "x" is 0 (Yes), an error message is displayed in step S27 to finish the process.

As described above, in case the anticipated battery energy to be consumed is not lower than the currently remaining battery energy, the frequency of the CPU 13 is lowered to decrease the consumed battery energy $\Delta b$ at a next measurement. The above-described processes are repeated so that the anticipated battery energy to be consumed is less than the remaining battery energy at a certain time. Thus, the image contents can be played to the last.

Second Embodiment

When a predetermined number of frames are decoded every second so as to have a predetermined frame rate, in case the frequency of the CPU 13 is low, a part of frames is not completely decoded within a predetermined time, so that a frame is dropped. Accordingly, the image data cannot be played with an adequate quality. On the other hand, in case the CPU frequency is high, all the frames can be completely decoded within the predetermined time. However, since the CPU frequency is higher than a required frequency, the electric power of the battery is undesirably consumed more than a required energy.

Figure 5:
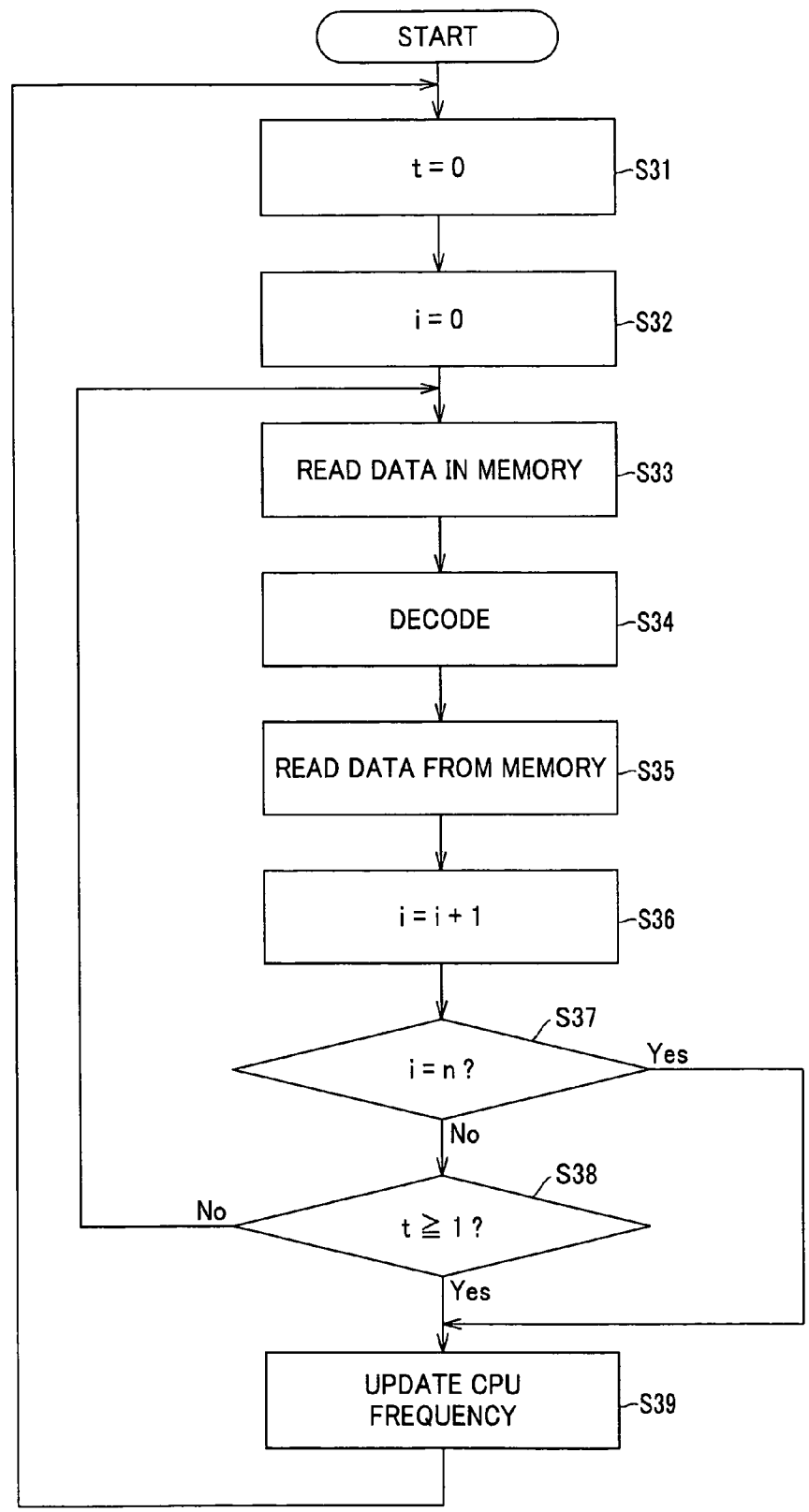
FIG. 5 is a flow chart for explaining a process when the CPU frequency is dynamically controlled on the basis of the number of frames that can be displayed during a unit time.

Thus, the image decoder 1 can dynamically control the frequency of the CPU 13 on the basis of the number of frames that can be displayed during a unit time as described below. A process in this case is shown in a flow chart of FIG. 5.

Firstly, in step S31, a counter timer "t" which gradually increases in accordance with a real time is initialized to 0. In step S32, a counter variable "i" showing the number of image data frames decoded during a unit time (one second) is initialize to 0.

Subsequently, in step S33, the image data of one frame is read in the memory 12. In step S34, the image data is decoded. In step S35, the decoded image data is read out to the display unit 14 from the memory 12.

Subsequently, in step S36, 1 is added to "i". In step S37, it is decided whether or not "i" corresponds to a frame rate "n" designated by a user. In case "i" corresponds to "n" (Yes), a playing quality requested by the user is satisfied within a time. Accordingly, in step S39, the frequency of the CPU 13 is updated to return to the step S31. In this case, since there is enough power for processing in the CPU 13, the frequency of the CPU 13 is lowered. The detail thereof will be described below. On the other hand, in case "i" does not correspond to "n" (No), in step S38, it is decided whether or not "t" is not smaller than 1. In case "t" is smaller than 1 (No), the process returns to the step S33 to process a next frame. On the other hand, in case "t" is not smaller than 1 (Yes), in the step S39, the frequency of the CPU 13 is updated to return to the step S31. In this case, there is not enough power for processing in the CPU 13, the frequency of the CPU 13 is raised. The detail thereof will be described later.

Figure 6:
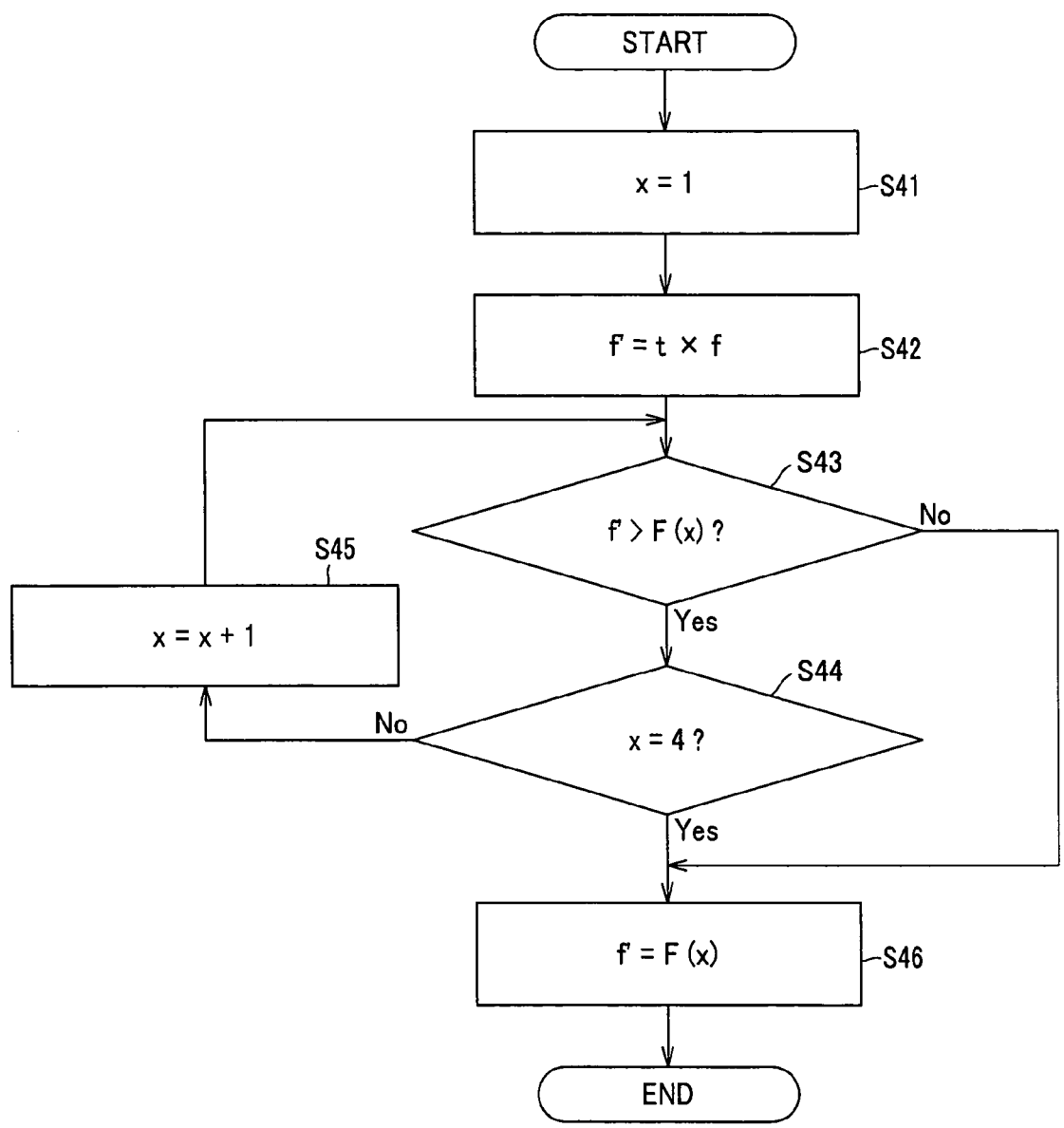
FIG. 6 is a flow chart for explaining a process upon dynamically controlling the CPU frequency on the basis of a time required for playing frames for a frame rate when the CPU frequency can be changed in several stages.

Here, as described above, the process is carried out for a unit time. At this time, in case there is enough power for processing in the CPU 13, "t" is smaller than 1. On the other hand, in case there is not enough power for processing in the CPU 13 and the process is not in time, a time "t" anticipated to be necessary for displaying the frames for the frame rate is not smaller than 1 from the number of frames that can be displayed within a time. Thus, a new CPU frequency f' is set to a value obtained by multiplying the current CPU frequency "f" by "t". On the other hand, generally, since the CPU frequency cannot be linearly controlled, the new CPU frequency is actually set to the lowest value among changeable operating frequencies which are not lower than f×t. A process in this case is shown in a flow chart of FIG. 6. In this example, the frequency of the CPU 13 is set to 100 MHz like the above-described example, which can be changed to 80 MHz, 60 MHz, and 40 MHz. Further, it is assumed that F(x)={40, 60, 80 and 100} and a variable "x" indicates an index of the current CPU frequency.

Firstly, in step S41, the index "x" is initialized to 1. In step S42, the current CPU frequency is multiplied by "t" to obtain f'.

Then, in step S43, it is decided whether or not f' is larger than F(x). In case f' is not larger than F(x) (No), in step S46, f' is updated to F(x) to finish the process. On the other hand, in case f' is larger than F(x) (Yes), it is decided whether or not "x" is 4 in step S44. Then, in case "x" is not 4 (No), in step S45, 1 is added to "x" to return to the step S43. On the other hand, in case "x" is 4, since "x" cannot be more increased, f' is updated to F(x) in step S46 to finish the process.

In such a way, in case there is enough power for processing in the CPU 13, the frequency of the CPU 13 is lowered to save the electric power. In case there is not enough power for processing in the CPU 13, the frequency of the CPU 13 is raised to complete a decoding process within a unit time.

As one example, it is assumed that a process is executed under the CPU frequency of 80 MHz of the CPU 13, and only 0.7 second is required for a process to be executed for one second. In this case, since "f" is equal to 80 and "t" is equal to 0.7, f' is equal to 80×0.7=56. In case "x" is equal to 1, since F(1) is equal to 40 and F(1) is smaller than 56, 1 is added to "x". Then, in case "x" is equal to 2, since F(2) is equal to 60 and F(2) is larger than 56, f' is updated to 60. In such a way, in case there is enough power for processing in the CPU 13, for instance, the frequency of the CPU 13 is lowered from 80 MHz to, for instance, 60 MHz to save the electric power.

In case the frequency of the CPU 13 is lowered from 80 MHz to 60 MHz, since an actually required CPU frequency is 56 MHz, there is enough power for executing other process to some degree in addition to the currently executed process. Specifically, the rate "r" of an additional process that can be executed is expressed by (f−f')/f'. In the above-described example, the additional process of approximately 7.1% according to (60−56)/56×100 can be executed. Thus, ability to execute the additional process is used so that the playing quality of the motion picture data can be improved as described below.

Figure 7:
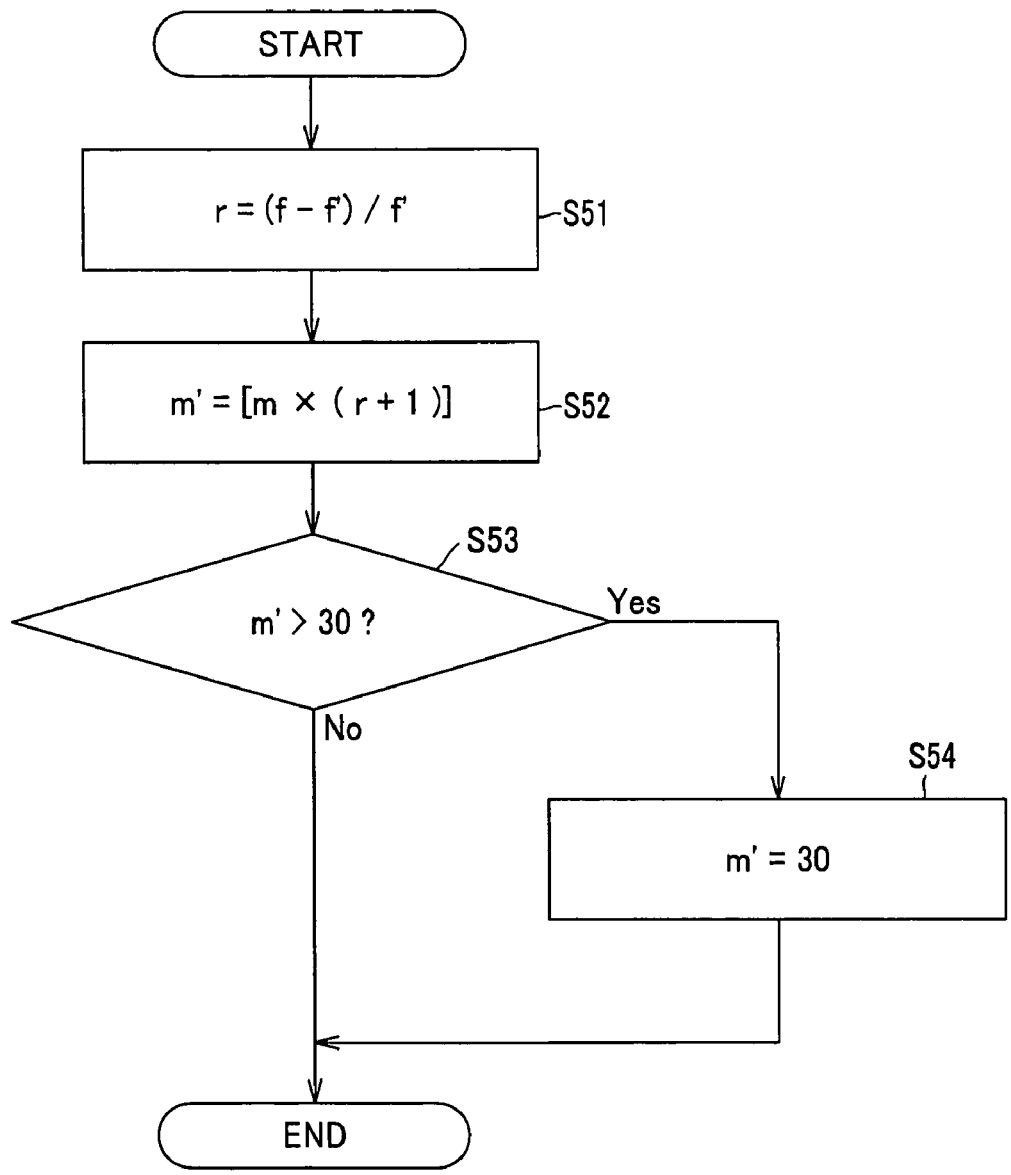
FIG. 7 is a flow chart for explaining a process when the frame rate is changed by using ability for executing additional process in the CPU.

A process when the frame rate is changed as the additional process is shown in a flow chart of FIG. 7. In this example, it is assumed that the frame rate of original motion picture data is 30 fps.

Initially, in step S51, the rate "r" (=(f−f')/f') for executing the additional process is obtained. In step S52, the current frame rate m is multiplied by (r+1) to obtain a new frame rate m'. In this case, since the frame rate can be designated only by a natural number, a value smaller than a decimal point is cut off.

Subsequently, in step S53, it is decided whether or not m' is larger than 30. In case m' is larger than 30 (Yes), the image data cannot be played with the frame rate higher than that of the original motion picture data. Thus, in step S54, 30 is set as m' to finish the process. In case m' is not larger than 30 (No), the value obtained in the step S52 is set as m' to finish the process.

Specifically, when the current frame rate is 15 fps, assuming that the additional process of 7.1% can be executed, m' is equal to 15×1.071=16.065. Even when one frame is increased and displayed for one second, the process can be executed under the same CPU frequency.

Figure 8:
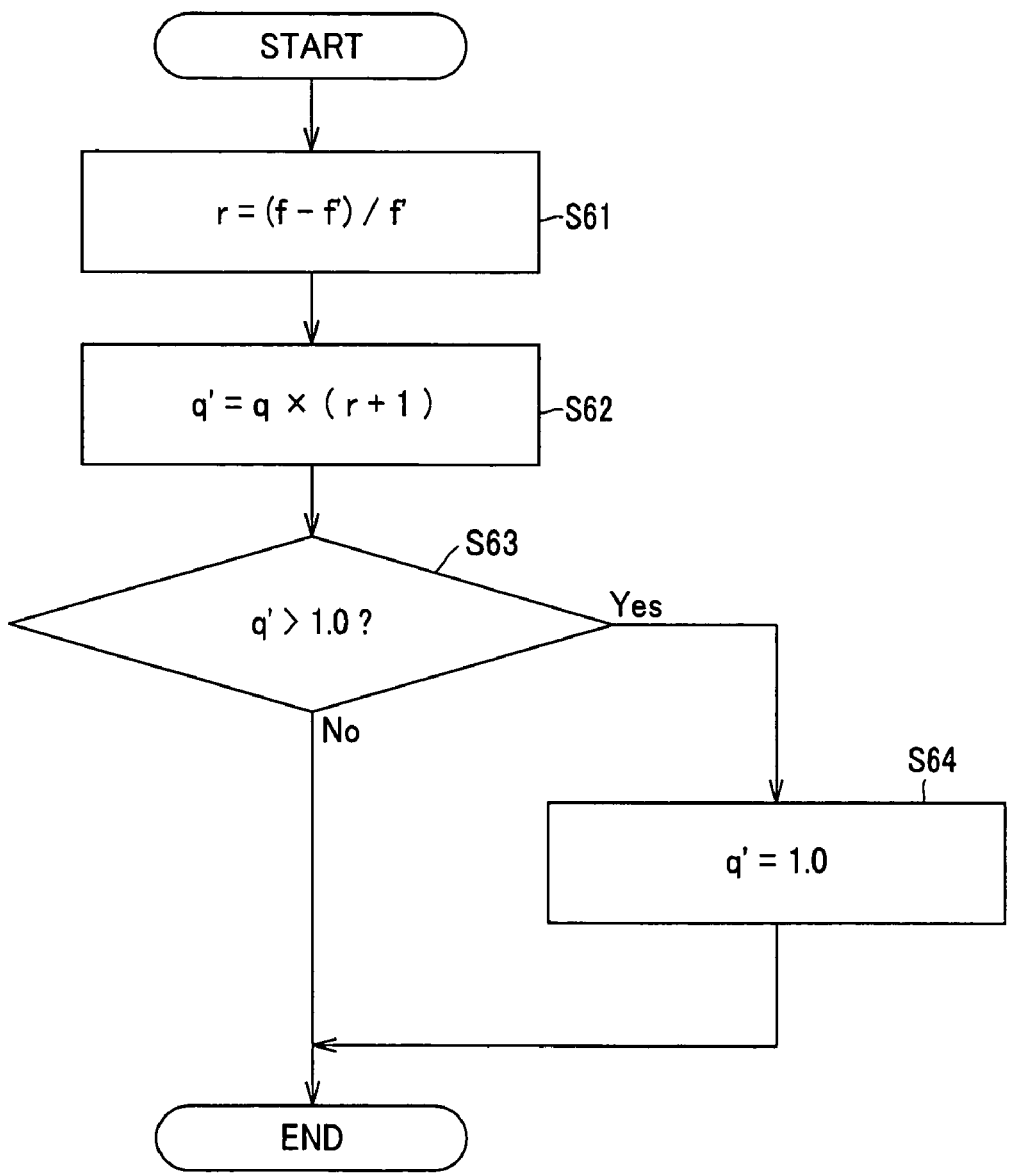
FIG. 8 is a flow chart for explaining a process when the number of bits per pixel is changed by using ability for executing additional process in the CPU.

Similarly, as the additional process, a process when the number of bits per pixel is changed is shown in a flow chart of FIG. 8.

Firstly, in step S61, the rate "r" (=(f−f')/f') for executing the additional process is obtained. In step S62, the current number of bits per pixel "q" is multiplied by (r+1) to obtain a new image quality q'.

Subsequently, in step S63, it is decided whether or not q' is larger than 1.0. In case q' is larger than 1.0 (Yes), the image data cannot be played with the image quality higher than that of the original motion picture data. Thus, in step S64, 1.0 is set as q' to finish the process. In case q' is not larger than 1.0 (No), the value obtained in the step S62 is set as q' to finish the process.

Specifically, when the current image quality is 0.7 bpp, assuming that the additional process of 7.1% can be executed, q' is approximately 0.75 according to 0.7×1.071. Even when 0.05 bit is increased and displayed for one pixel, the process can be executed under the same CPU frequency.

As described above, the rate "r" for executing the additional process is obtained, and then, the frame rate or the number of bits per pixel is changed within that range. Thus, the playing quality of the image data can be improved without changing the frequency of the CPU 13.

In case the additional process is executed, when f' is next calculated, it is necessary to consider that the counter timer "t" is increased to a value, including the additional process. That is, "t" is divided by (r+1) to obtain a time necessary for an original process, and then, f' needs to be calculated.

Further, in the image decoder 1, when a plurality of processes are executed at the same time, the time "t" required for playing the image data receives an influence of other processes. Thus, when f' is calculated, this fact needs to be considered. Specifically, assuming that a time necessary for other process during the time "t" is "c" and an anticipated time required for other process for next one second is c', a new CPU frequency f' is set to a value obtained by multiplying the current CPU frequency "f" by (t−c)/(1−c').

Third Embodiment

Figure 9:
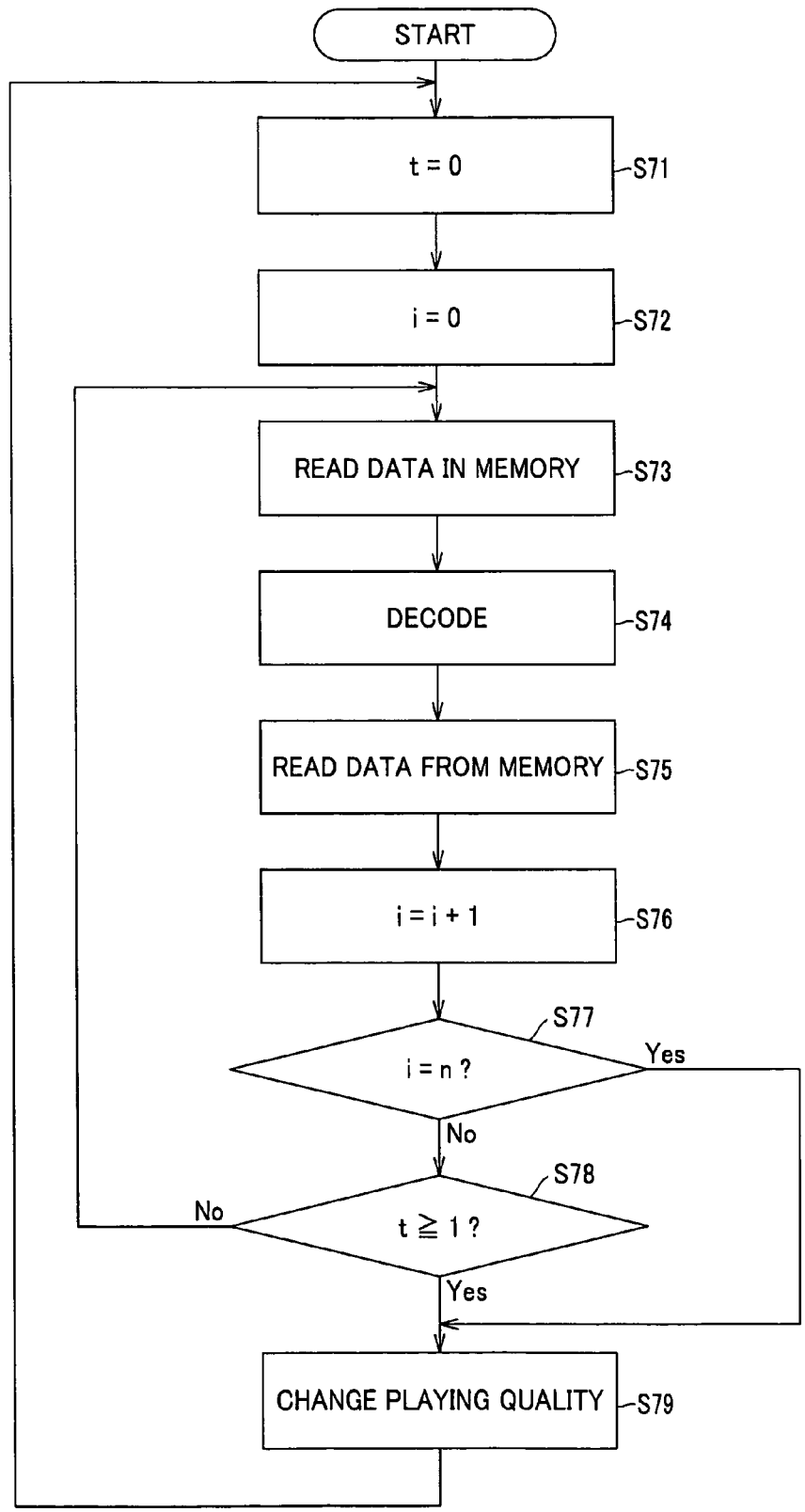
FIG. 9 is a flow chart for explaining a process when the playing quality of motion picture data is dynamically controlled on the basis of the number of frames that can be displayed during a unit time.

In the second embodiment, the frequency of the CPU 13 is dynamically controlled on the basis of the number of frames that can be displayed during a unit time. On the other hand, the playing quality can be also dynamically controlled. That is, in the above-described second embodiment, when it takes only 0.7 second for a process to be executed for one second, the CPU frequency is lowered to 70%. Further, the playing quality may be enhanced to approximately 1/0.7=1.4 times. A process in this case is shown in a flow chart of FIG. 9.

Firstly, in step S71, a counter timer "t" which gradually increases in accordance with a real time is initialized to 0. In step S72, a counter variable "i" showing the number of image data frames decoded during a unit time (one second) is initialize to 0.

Subsequently, in step S73, the image data of one frame is read in the memory 12. In step S74, the image data is decoded. In step S75, the decoded image data is read out to the display unit 14 from the memory 12.

Subsequently, in step S76, 1 is added to "i". In step S77, it is decided whether or not "i" corresponds to a frame rate "n" designated by a user. In case "i" corresponds to "n" (Yes), a playing quality requested by the user is satisfied within a time. To further improve the playing quality, in step S79, the playing quality of the motion picture data is changed to return to the step S71. On the other hand, in case "i" does not correspond to "n" (No), in step S78, it is decided whether or not "t" is not smaller than 1. In case "t" is smaller than 1 (No), the process returns to the step S73 to process a next frame. On the other hand, in case "t" is not smaller than 1 (Yes), in the step S79, the playing quality of the motion picture data is changed to return to the step S71. In this case, there is not enough power for processing, so that the playing quality is lowered. The detail thereof will be described later.

Figure 10:
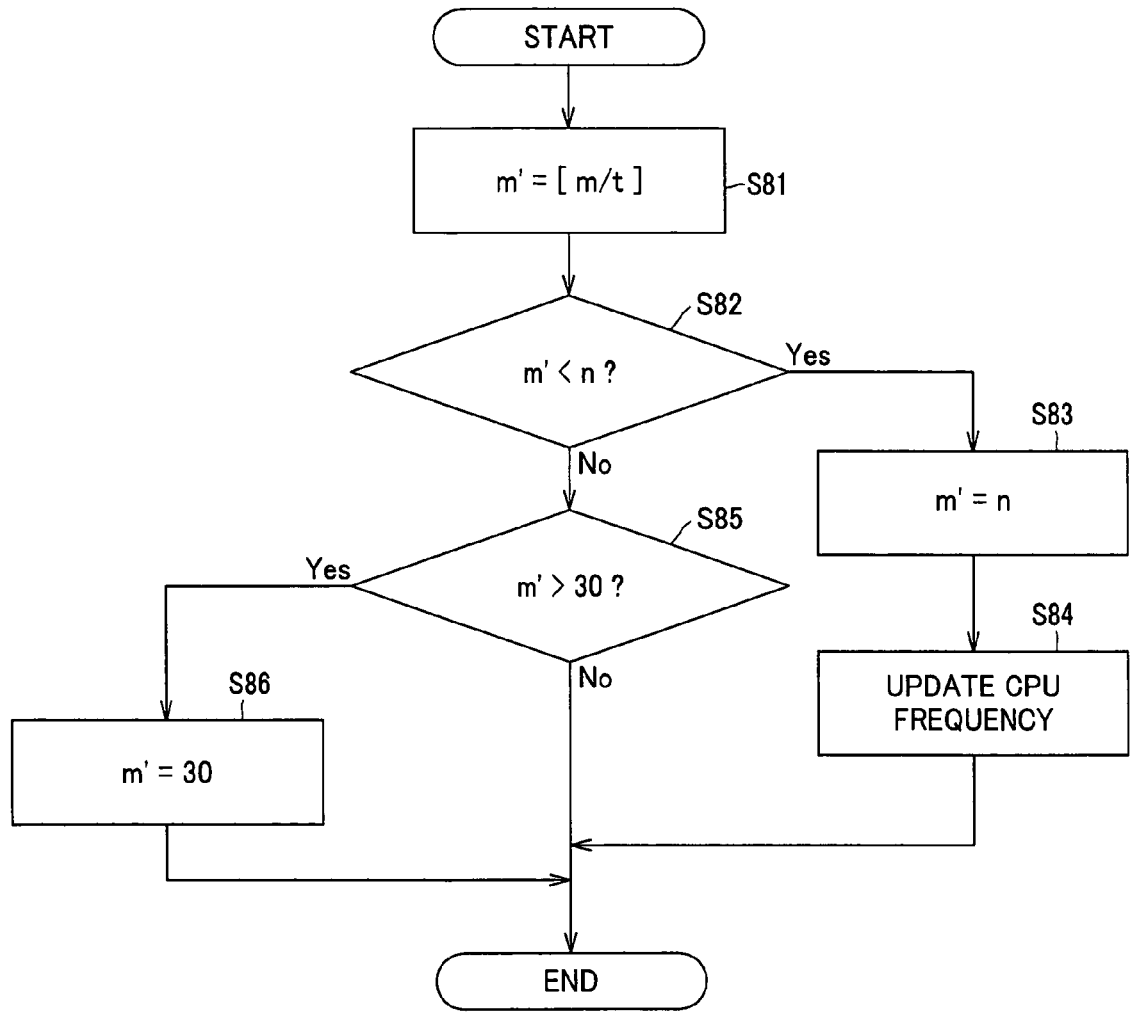
FIG. 10 is a flow chart for explaining a process when the frame rate is changed to change the playing quality.

A process to change the frame rate to change the playing quality is shown in a flow chart of FIG. 10. In this example, it is assumed that the frame rate of the original motion picture data is 30 fps.

Initially, in step S81, the current frame rate "m" is divided by "t" to obtain a new frame rate m'. In this case, since the frame rate can be designated only by a natural number, a value smaller than a decimal point is cut off.

Subsequently, in step S82, it is decided whether or not m' is smaller than the frame rate "n" designated by the user. In case m' is smaller than "n" (Yes), "n" is set as m' to assure the frame rate "n" designated by the user at minimum in step S83. In step S84, the frequency of the CPU 13 is updated to finish the process. On the other hand, in case m' is not smaller than "n" (No), in step S85, it is decided whether or not m' is larger than 30. Then, in case m' is larger than 30 (Yes), since the image data cannot be played with a frame rate higher than the frame rate of the original motion picture data, 30 is set as m' in step S86 to finish the process. On the other hand, in case m' is not larger than 30 (No), the value obtained in the step S81 is set as m' to finish the process.

Figure 11:
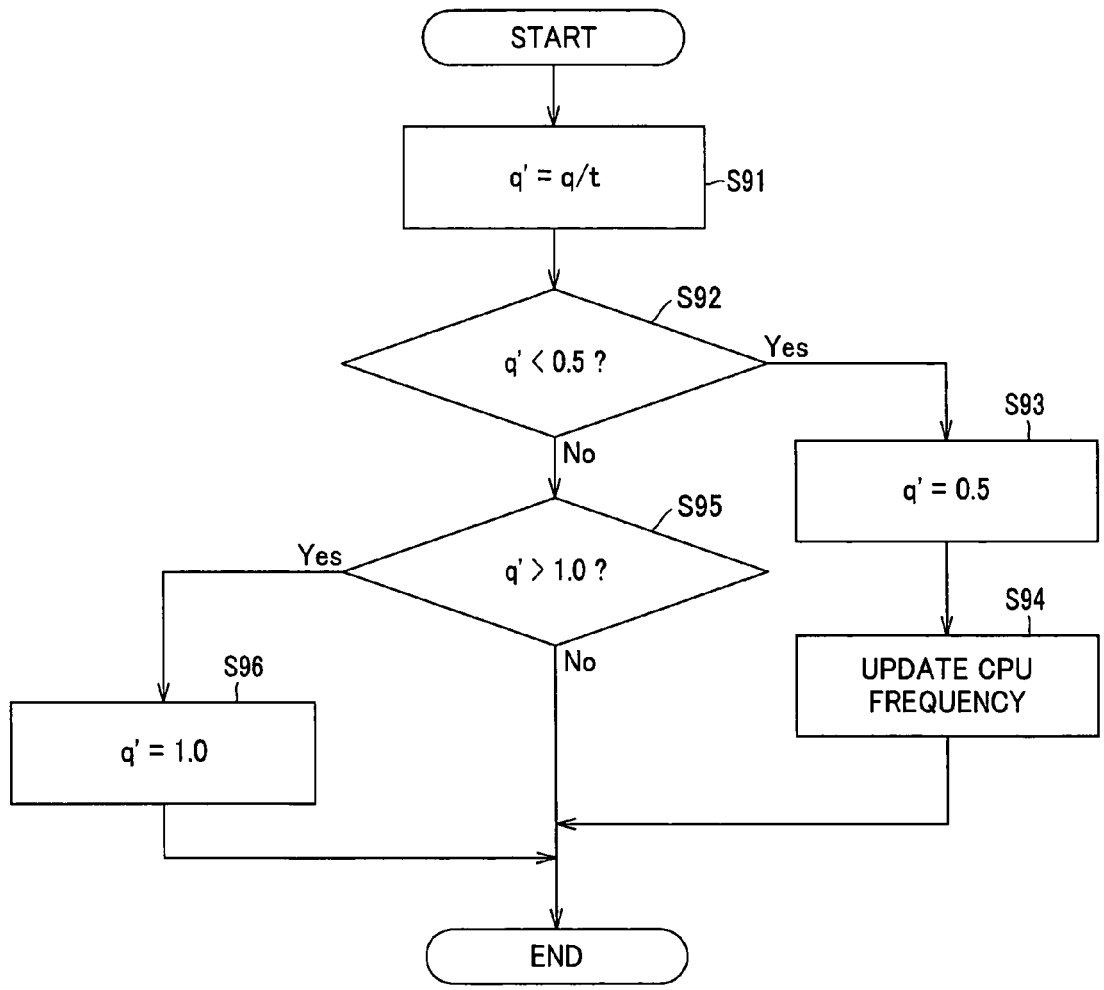
FIG. 11 is a flow chart for explaining a process when the number of bits per pixel is changed to change the playing quality.

Similarly, a process to change the number of bits per pixel to change the playing quality is shown in a flow chart of FIG. 11.

Firstly, step S91, the current number of bits per pixel "q" is divided by "t" to obtain a new image quality q'.

Then, in step S92, it is decided whether or not q' is smaller than 0.5 bpp as the image quality designated by the user. In case q' is smaller than 0.5 (Yes), in step S93, 0.5 is set as q' to assure the image quality designated by the user at the very least. In step S94, the frequency of the CPU 13 is updated to finish the process. On the other hand, in case q' is not smaller than 0.5 (No), in step S95, it is decided whether or not q' is larger than 1.0. Then, in case q' is larger than 1.0 (Yes), since the image data cannot be played with the image quality higher than the image quality of the original motion picture data, 1.0 is set as q' in step S96 to finish the process. On the other hand, in case q' is not larger than 1.0 (No), the value obtained in the step S91 is set as q' to finish the process.

As described above, the playing quality of the motion picture data is dynamically controlled on the basis of the number of frames that can be displayed during a unit time. Thus, when there is enough power for processing in the CPU 13, the playing quality of the motion picture data can be improved. When there is not enough power for processing in the CPU 13, the playing quality of the motion picture data is lowered to complete the decoding process within a unit time.

Although the preferred embodiments of the present invention are described by way of the first to third embodiments, the present invention is not limited to the above-described embodiments mentioned by referring to the drawings. It is apparent for a person with ordinary skill in the art that various changes, substitutions or equivalence thereto may be made without departing the scope and gist of the present invention.

What is claimed is:

1. An image decoder for decoding encoded motion picture data composed of plural frames of image data and for displaying the decoded motion picture data; the image decoder comprising:

an electric power source having consumable energy for supplying electric power to respective units of the image decoder;

means for determining the remaining energy of said source;

a decoding means for decoding the frames of image data of the encoded motion picture data at an adjustable number of bits per pixel of the decoded motion picture data;

means for measuring the amount of energy that was consumed during a decoding time interval;

means for estimating the amount of energy anticipated to decode and display remaining motion picture data as a function of the measured amount of energy that was consumed;

a displaying means for displaying the frames of the decoded motion picture data; and a controlling means for controlling the number of bits per pixel of the decoding means on the basis of a difference between said anticipated energy needed for decoding and displaying the motion picture data and the remaining energy of the electric power source to dynamically control the playing quality of the motion picture data by selectively reducing said number of bits per pixel.

2. The image decoder according to claim 1, wherein said means for determining the remaining energy comprises a load monitoring means for monitoring the computational load of the decoding means.

3. An image decoding method performed by an image decoder for decoding encoded motion picture data composed of plural frames of image data and for displaying the decoded motion picture data comprising the steps of:

decoding, by use of an image decoder, the frames of image data of the encoded motion picture data to provide an adjustable number of bits per pixel of the decoded motion picture data;

displaying the frames of the decoded motion picture on a display device;

measuring, by a processor, the amount of energy of an electric power source that supplies electric power to respective units of the image decoder that was consumed during a decoding time interval;

estimating, by said processor, the amount of energy anticipated to decode and display remaining motion picture data as a function of the measured amount of energy that was consumed; and controlling the number of bits per pixel in the decoding step of said image decoder on the basis of a difference between said anticipated energy needed for decoding and displaying the motion picture data and the remaining energy of said electric power source by selectively reducing said number of bits per pixel.

4. The image decoding method according to claim 3, wherein the decoding step further comprises monitoring a computational load when decoding.

5. A program embodied in a computer-readable medium for controlling an image decoding process performed by an image decoder for decoding encoded motion picture data composed of plural frames of image data and for displaying the decoded motion picture data by:

decoding the frames of image data of the encoded motion picture data to provide an adjustable number of bits per pixel of the decoded motion picture data;

displaying the frames of the decoded motion picture data;

measuring the amount of energy of an electric power source that supplies electric power to respective units of the image decoder that was consumed during a decoding time interval;

estimating the amount of energy anticipated to decode and display remaining motion picture data as a function of the measured amount of energy that was consumed; and controlling the number of bits per pixel in the decoding step on the basis of a difference between said anticipated energy needed for decoding and displaying the motion picture data and the remaining energy of said electric power source t by selectively reducing said number of bits per pixel.

6. An image decoder for decoding encoded motion picture data composed of plural frames of image data and for displaying the decoded motion picture data; the image decoder comprising:

a decoding means for decoding the frames of image data of the encoded motion picture data at an adjustable number of bits per pixel;

a displaying means for displaying the frames of the decoded motion picture data; and a controlling means for anticipating the time needed to display a predetermined number of frames on the basis of the number of frames that can be displayed during a unit time and for controlling the decoding means to dynamically reduce the number of bits per pixel of the decoded image data when said anticipated time to display said predetermined number of frames is less than a predetermined threshold.

7. An image decoding method for decoding encoded motion picture data composed of plural frames of image data and for displaying the decoded motion picture data, comprising the steps of:

decoding, by use of an image decoder, the frames of image data of the encoded motion picture data at an adjustable number of bits per pixel;

displaying the frames of the decoded motion picture data on a display device;

anticipating, by a processor, the time needed to display a predetermined number of frames on the basis of the number of frames that can be displayed during a unit time; and controlling the decoding step of said image decoder to dynamically reduce the number of bits per pixel of the decoded image data when said anticipated time to display said predetermined number of frames is less than a predetermined threshold.

8. A program embodied in a computer readable medium for controlling an image decoding process to decode encoded motion picture data composed of plural frames of image data and for displaying the decoded motion picture data by:

decoding the frames of image data of the encoded motion picture data at an adjustable number of bits per pixel;

displaying the frames of the decoded motion picture data;

anticipating the time needed to display a predetermined number of frames on the basis of the number of frames that can be displayed during a unit time; and controlling the decoding step to dynamically reduce the number of bits per pixel of the decoded image data when said anticipated time to display said predetermined number of frames is less than a predetermined threshold.

* * * * *

UNITED STATES PATENT AND TRADEMARK OFFICE
CERTIFICATE OF CORRECTION

PATENT NO. : 7,639,743 B2  Page 1 of 1
APPLICATION NO. : 10/809227
DATED : December 29, 2009
INVENTOR(S) : Hiroshi Kyusojin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1113 days.

Signed and Sealed this

Ninth Day of November, 2010

David J. Kappos
*Director of the United States Patent and Trademark Office*